(12) United States Patent
Oakley

(10) Patent No.: US 9,110,631 B2
(45) Date of Patent: Aug. 18, 2015

(54) ELECTRONIC DEVICE HAVING BASE IN THE FORM OF AN OUTER SUPPORT FRAME

(71) Applicant: INTEL CORPORATION, Santa Clara, CA (US)

(72) Inventor: Nicholas W. Oakley, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 258 days.

(21) Appl. No.: 13/729,236

(22) Filed: Dec. 28, 2012

(65) Prior Publication Data
US 2014/0185196 A1 Jul. 3, 2014

(51) Int. Cl.
*G06F 1/16* (2006.01)

(52) U.S. Cl.
CPC ............ *G06F 1/1643* (2013.01); *G06F 1/1616* (2013.01); *G06F 1/1624* (2013.01)

(58) Field of Classification Search
CPC ...... G06F 1/1615; G06F 1/162; G06F 1/1643
See application file for complete search history.

(56) References Cited

U.S. PATENT DOCUMENTS

| | | | | |
|---|---|---|---|---|
| 5,085,394 | A * | 2/1992 | Torii ............................ | 248/455 |
| 5,255,214 | A * | 10/1993 | Ma ........................... | 361/679.06 |
| 6,266,236 | B1 | 7/2001 | Ku et al. | |
| 6,464,195 | B1 * | 10/2002 | Hildebrandt .................. | 248/460 |
| 6,903,927 | B2 * | 6/2005 | Anlauff ..................... | 361/679.28 |
| 7,184,263 | B1 * | 2/2007 | Maskatia ................. | 361/679.27 |
| 7,239,505 | B2 * | 7/2007 | Keely et al. .............. | 361/679.09 |
| 7,586,743 | B2 * | 9/2009 | Lin .......................... | 361/679.55 |
| 7,652,873 | B2 * | 1/2010 | Lee ........................... | 361/679.06 |
| 7,724,511 | B2 * | 5/2010 | Jacobs ..................... | 361/679.27 |
| 8,421,824 | B2 * | 4/2013 | Brown et al. ................. | 345/634 |
| 8,654,520 | B2 * | 2/2014 | Lin et al. .................. | 361/679.27 |
| 8,770,538 | B2 * | 7/2014 | Hsu et al. ...................... | 248/685 |
| 2006/0077622 | A1 | 4/2006 | Keely et al. | |
| 2007/0046635 | A1 | 3/2007 | Nishiyama et al. | |
| 2007/0152113 | A1 * | 7/2007 | Okuley et al. ................. | 248/133 |
| 2008/0180892 | A1 | 7/2008 | Lai | |
| 2012/0268880 | A1 | 10/2012 | Tomita et al. | |
| 2013/0038996 | A1 * | 2/2013 | Griffin et al. ............ | 361/679.08 |
| 2013/0077212 | A1 * | 3/2013 | Nakajima ................ | 361/679.01 |
| 2013/0141855 | A1 * | 6/2013 | Tseng et al. ............ | 361/679.09 |
| 2013/0242521 | A1 * | 9/2013 | Lin et al. ....................... | 361/807 |

FOREIGN PATENT DOCUMENTS

| | | |
|---|---|---|
| JP | 2007-065995 | 3/2007 |
| WO | 2014/105238 A1 | 7/2014 |

OTHER PUBLICATIONS

International Search Report and Written Opinion for Application PCT/US2013/061954 dated Jan. 17, 2014.

\* cited by examiner

*Primary Examiner* — Anthony Q Edwards
(74) *Attorney, Agent, or Firm* — KED & Associates LLP

(57) ABSTRACT

The electronic device having a base in the form of an outer support frame is provided. The electronic device may include a base in the form of an outer support frame, the base having an opening extending therethrough formed by the outer support frame; a keyboard disposed within at least a portion of the opening and supported by the outer support frame; and a display attached to the base. The display may be slidably attached to the base. Further, the display may include a touchscreen.

20 Claims, 8 Drawing Sheets

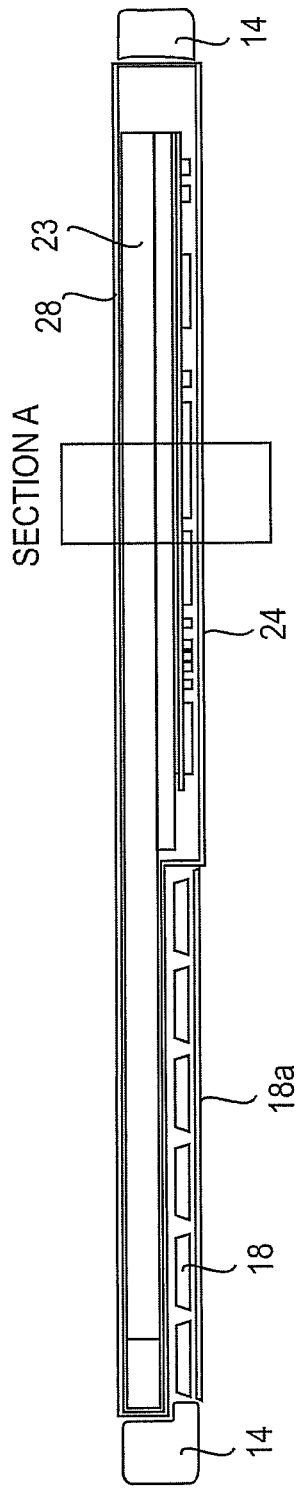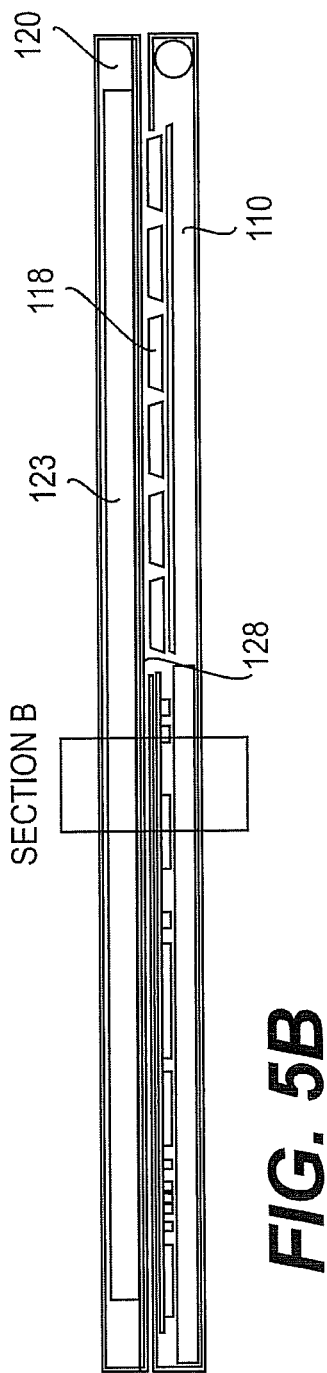

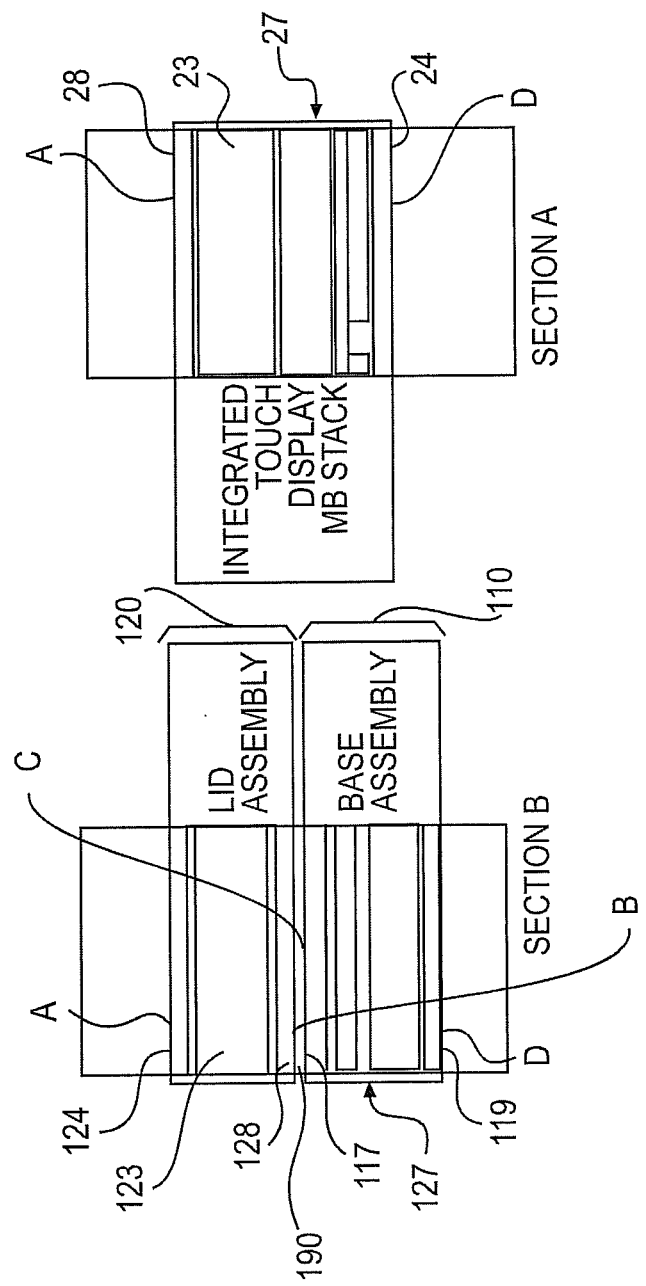

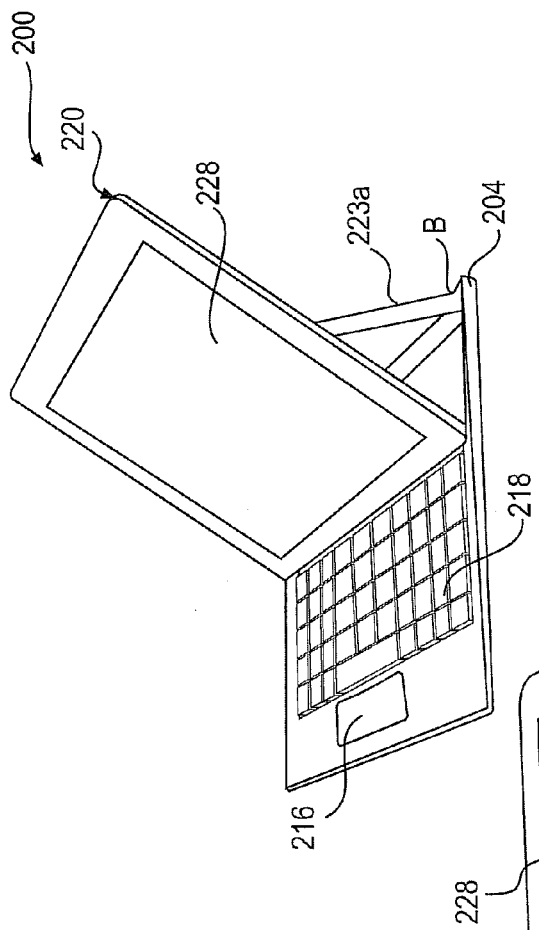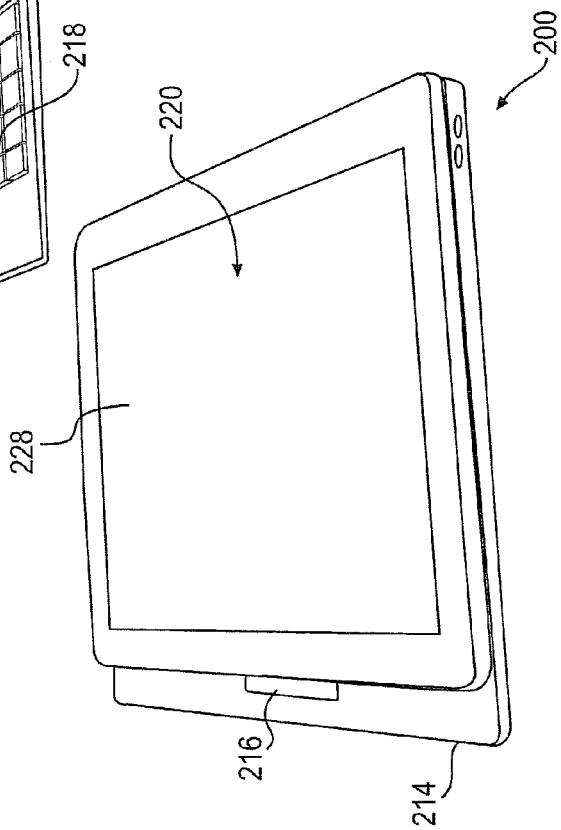

ELECTRONIC DEVICE HAVING BASE IN THE FORM OF AN OUTER SUPPORT FRAME

BACKGROUND

1. Field

An electronic device having a base in the form of an outer support frame is disclosed herein.

2. Background

Electronic devices are known. However, they suffer from various disadvantages.

BRIEF DESCRIPTION OF THE DRAWINGS

Embodiments will be described in detail with reference to the following drawings in which like reference numerals refer to like elements, and wherein:

FIG. 5A is a schematic cross-sectional view of the electronic device of FIG. 1, shown with the display in the first position;

FIG. 5B is a schematic cross-sectional view of a conventional clamshell type electronic device for comparison purposes;

FIG. 5C is a schematic drawing of portion B of FIG. 5B;

FIG. 5D is a schematic drawing of portion A of FIG. 5A;

FIG. 6A is a perspective view of an electronic device having a base in the form of an outer support frame according to another embodiment, shown with a display in a first position;

FIG. 6B is a side perspective view of the electronic device of FIG. 6A, shown with the display in a second position.

DETAILED DESCRIPTION

In the following detailed description, like numerals and characters may be used to designate identical, corresponding and/or similar components in differing figure drawings. Further, in the detailed description to follow, example sizes/models/values/ranges may be given although embodiments are not limited to the same. Where specific details are set forth in order to describe example embodiments, it should be apparent to one skilled in the art that embodiments may be practiced without these specific details.

Embodiments will now be described in detail with reference to the accompanying drawings. Where possible, like reference have been used to indicate like elements.

Various embodiments directed to an electronic device having a base in the form of an outer support frame are disclosed herein. However, it should be understood that the various elements of the various embodiments may be combined or interchanged to create a desired electronic device.

Figure 1:
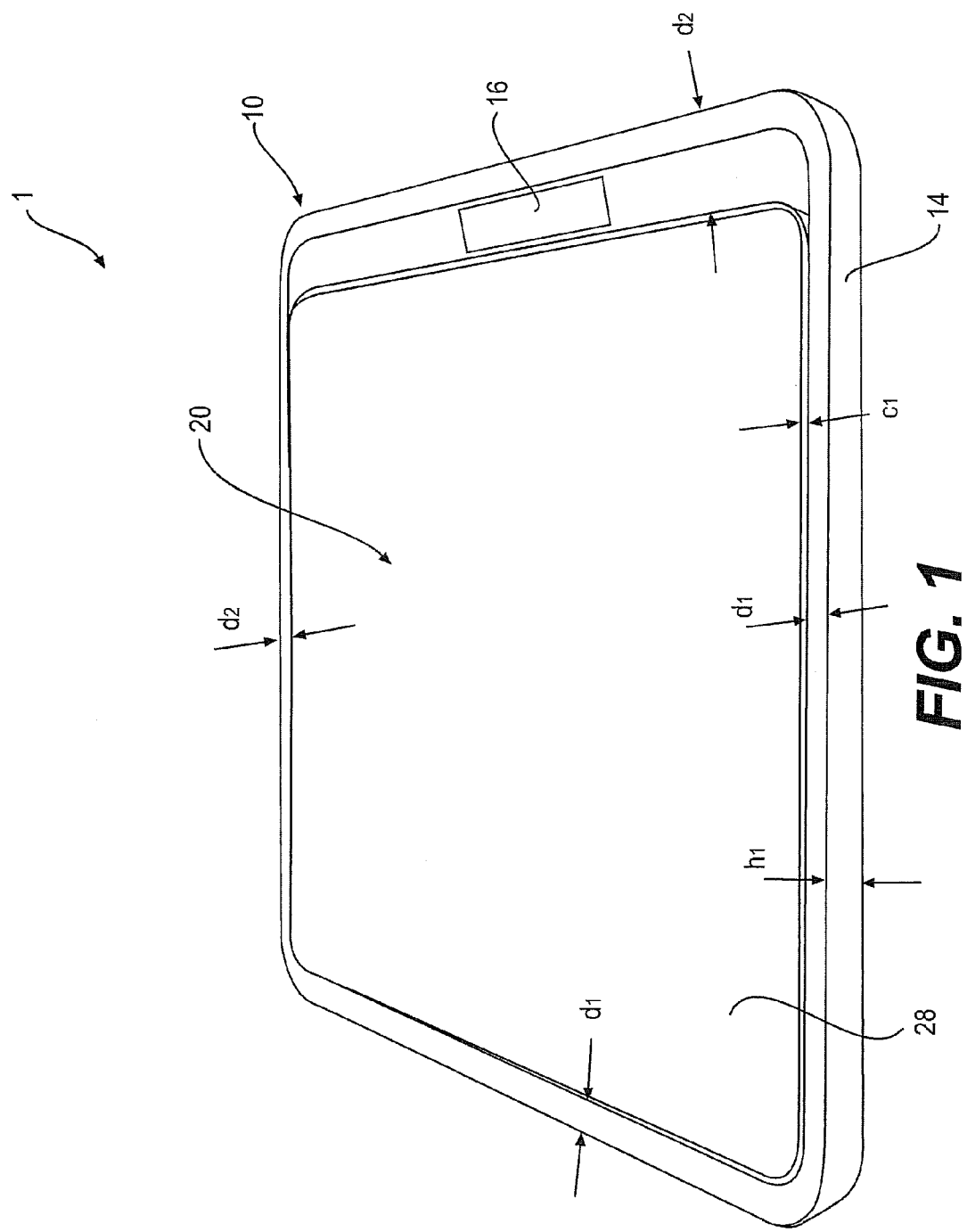
FIG. 1 is a perspective view of an electronic device having a base in the form of an outer support frame according to an embodiment, shown with a display in a first position.
Figure 2:
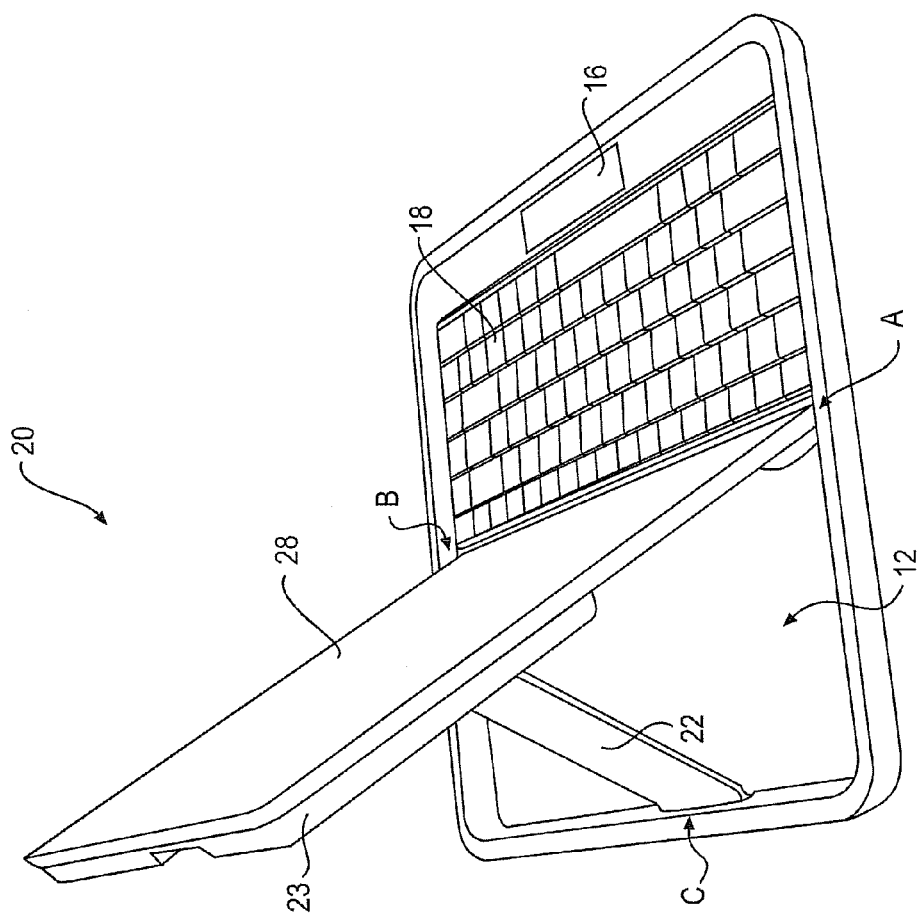
FIG. 2 is a side perspective view of the electronic device of FIG. 1, shown with the display in a second position.
Figure 3:
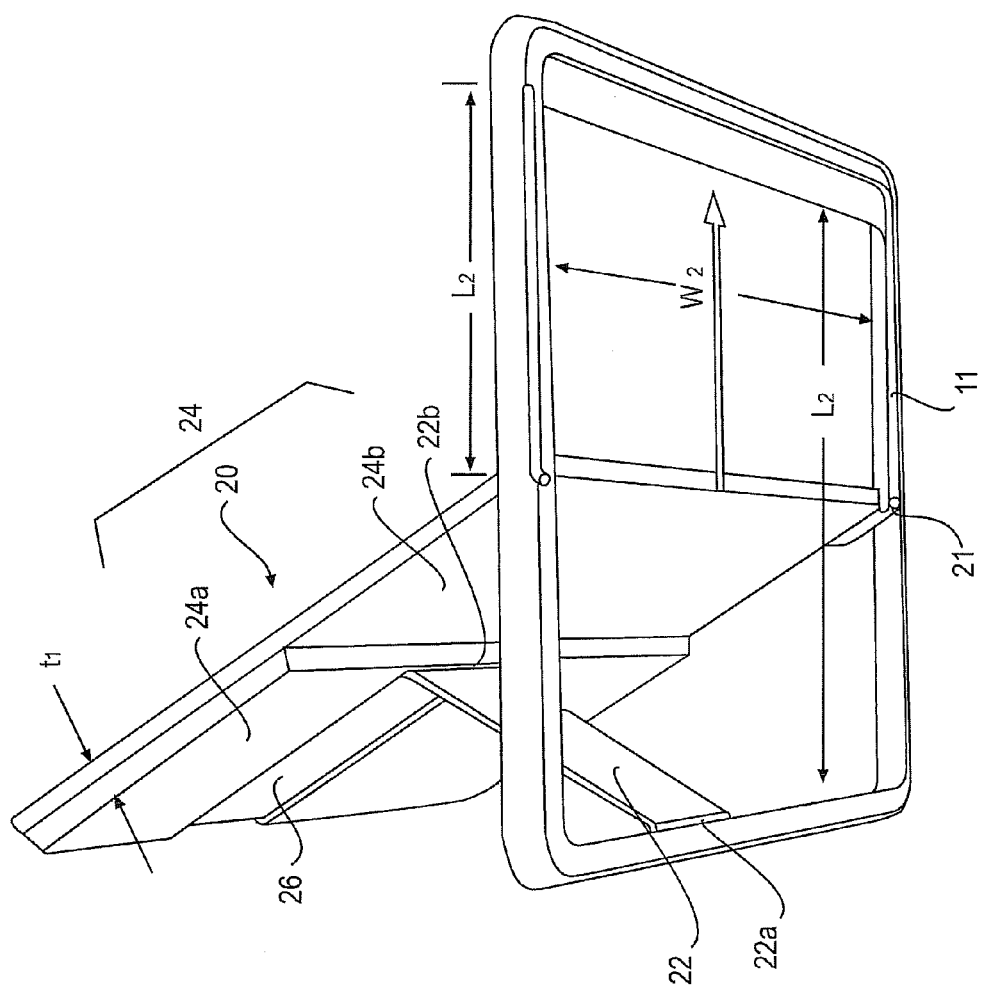
FIG. 3 is a bottom perspective view of the electronic device of FIG. 1, shown with the display in the second position.
Figure 4:
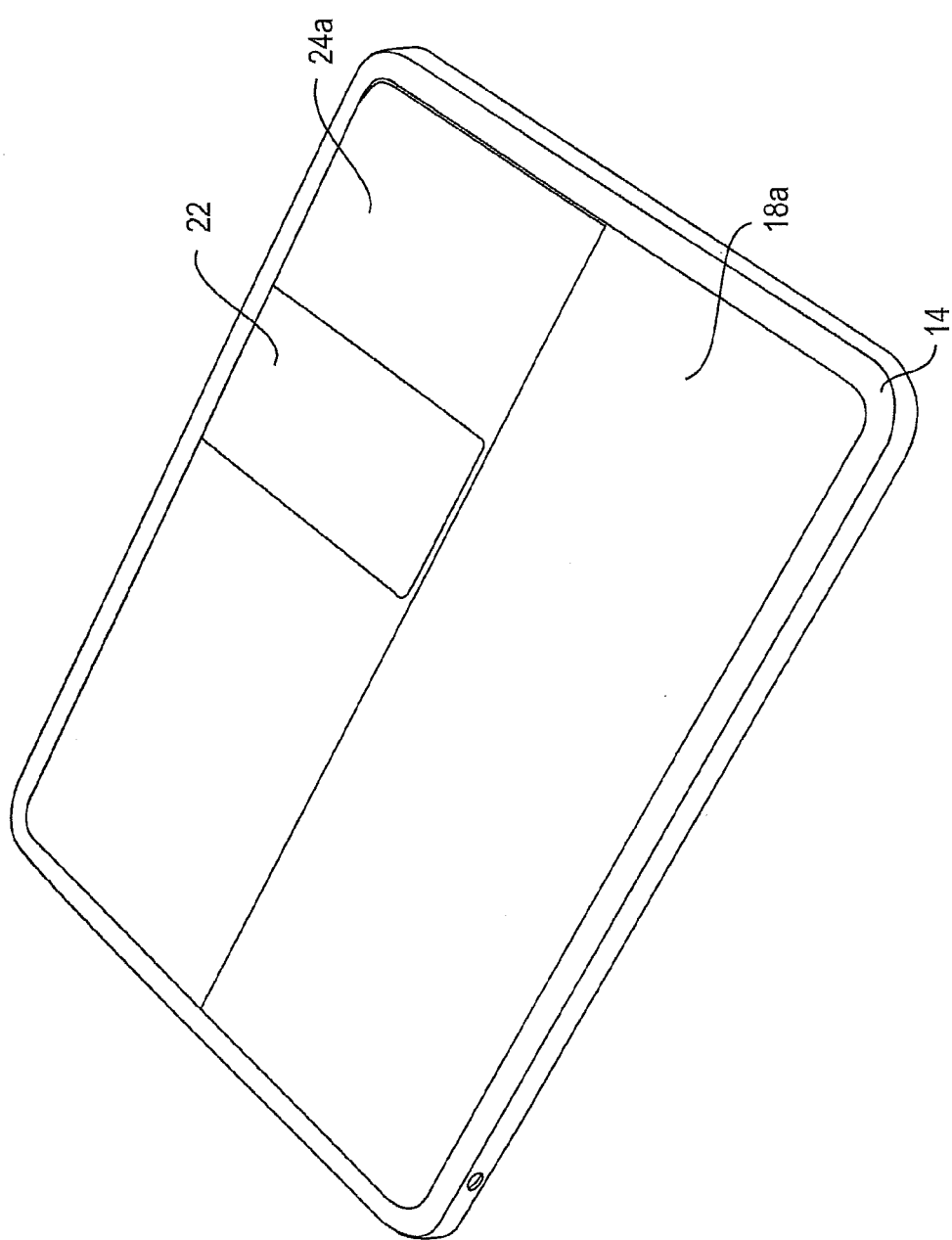
FIG. 4 is a bottom perspective view of the electronic device of FIG. 1, shown with the display in the first position.

FIG. 1 is a perspective view of an electronic device having a base in the form of an outer support frame according to an embodiment. FIG. 2 is a side perspective view of the electronic device of FIG. 1, shown with the display in the second position. FIG. 3 is a bottom perspective view of the electronic device of FIG. 1, shown with the display in a second position. FIG. 4 is a bottom perspective view of the electronic device of FIG. 1, shown with the display in the first position.

The electronic device 1 of FIG. 1 may include a base 10. The base 10 may be in the form of a structural outer ring or outer support frame 14. The term "ring" refers to a (ring-like) structure surrounding other elements and functioning to contain and/or protect them. The outer support frame 14 may be in the form of a "ring"; however, embodiments are not so limited. That is, other shapes may also be appropriate, such as a U-shape. The base 10 may include an opening 12 formed by the outer support frame 14.

The outer support frame 14 may be formed of, for example, aluminum. However, embodiments are not so limited, and other materials may also be appropriate.

The support frame outer support frame 14 may be, for example, rectangular. However, embodiments are not so limited, and other shapes may also be appropriate.

A keyboard 18 may be positioned within at least a portion of the outer support frame 14, as shown in FIG. 1, and supported thereby. Further, a user input device 16, such as a track-pad, may be provided on the outer support frame 14. A battery to power the electronic device may be located under the keyboard.

The outer support frame 14 may have a predetermined thickness d1 along first, second, and third sides thereof, and a predetermined thickness d2 along a fourth side. Further, the outer support frame 14 may have a predetermined height h1. The opening 12 may have a predetermined length L1 and width W1.

A display 20 may be slidably attached to the base 10. The display 20 may be, for example, a touch pad type display. The display 20 may be slidably attached to the outer support frame 14.

The display 20 may include a main body 23 having a screen 28, such as a touchscreen, on a front surface thereof. The display 20 may further include at least one support arm 22. However, embodiments are not so limited. Alternatively, the display may include a pair of support arms on either side of the electronic device.

A first end of the at least one support arm 22 may be rotatably attached to the outer support frame 14. A second end 22b of the at least one support arm 22 may be rotatably attached to a rear surface 24 of the main body 23.

Lower side end portions of the main body 23 may include a pair of protrusions or hooks 21 configured to mate with rails or grooves 11 provided on inner surfaces of the outer support frame 14. The rails or grooves 11 may extend a length L2.

The display 20 may be positioned in a first position (tablet mode), in which the display 20 is retracted into the outer support frame 24, as shown in FIG. 1, or a second position (clamshell mode), as shown in FIGS. 2-3, in which the display is supported by the outer support frame 14 at at least three points, points A, B, and C, as shown in FIG. 2. When the display 20 is in the first position, it may cover the keyboard 18; however, the user input 16 may remain accessible by a user.

Further, in the first position, a clearance gap c1 may be provided between outer edges of the display 20 and inner edges of the outer support frame 14. The clearance gap c1 may be configured to allow for air flow around the display 20, when the display 20 is in the first position.

Furthermore, when the display 20 is in the first position, an upper surface of the display 20 may protrude above a surface of the base 10. Alternatively, the upper surface of the display 20 may be flush with an upper surface of the base 10.

Further, the rear surface 24 of the main body 23 of the display 20 may include first and second portions 24a and 24b having different thickness. That is, the first portion 24a may have a thickness t1, and the second portion 24b may have a thickness t2. Furthermore, the thickness t1 of the first portion 24a may be greater than the thickness t2 of the second portion 24b. The first portion 24a may include at least one groove 26 configured to receive the at least one support arm 22, when the display 20 is in the first position. Reference numeral 18a depicts a rear surface of the keyboard 18.

Cabling for the keyboard, a battery, and other accessories, such as audio, may be passed through the support arm 22 to the display 20.

Embodiments disclosed herein reduce an overall thickness of the electronic device when in a tablet mode, as discussed hereinbelow.

FIG. 5A is a schematic cross-sectional view of the electronic device of FIG. 1, shown with the display in the first position. FIG. 5B is a schematic cross-section view of a conventional clamshell type electronic device for comparison purposes. FIG. 5C is a schematic drawing of portion B of FIG. 5B. FIG. 5D is a schematic drawing of portion A of FIG. 5A.

Referring to FIGS. 5B-5C, the clamshell type electronic device 100 includes a base 110. The base 110 includes a keyboard 118. The display 120 includes a display panel/main body 123 with a display screen 128. The display 120 further includes a rear surface 124. The base includes a front surface 117, a rear surface 119, and a battery/mother board (MB) stack 127 disposed therebetween.

As shown in FIGS. 5C-5D, the electronic device according to embodiments disclosed herein results in a thinner device in comparison to a convention clamshell type electronic device. A clamshell device, when closed, layers up all of its components between the lid ('A' surface), screen ('B' surface), keyboard and palmrest ('C' surface), and base ('D' surface). Each of these surfaces has a thickness, and they each have to have a clearance from their neighboring surfaces which add to a total thickness of the clamshell device. See thickness driving section B of FIG. 5B. A table-style device has only an 'A' surface and a 'D' surface, which allows it to be slimmer. See thickness driving section A of FIG. 5A. In creating a tablet-style stack of a thickness least negotiable components within an area of the outer structural ring or outer support frame embodiments disclosed herein include thinner overall form factors. Another way of looking at it might be to consider the top surface of the outer structural ring or outer support frame as a 'C' surface, and the bottom as a 'D' surface, and embodiments disclosed herein include a huge hole through the middle, which lets the tablet-style stack drive the overall thickness of the electronic device.

Figure 6C:
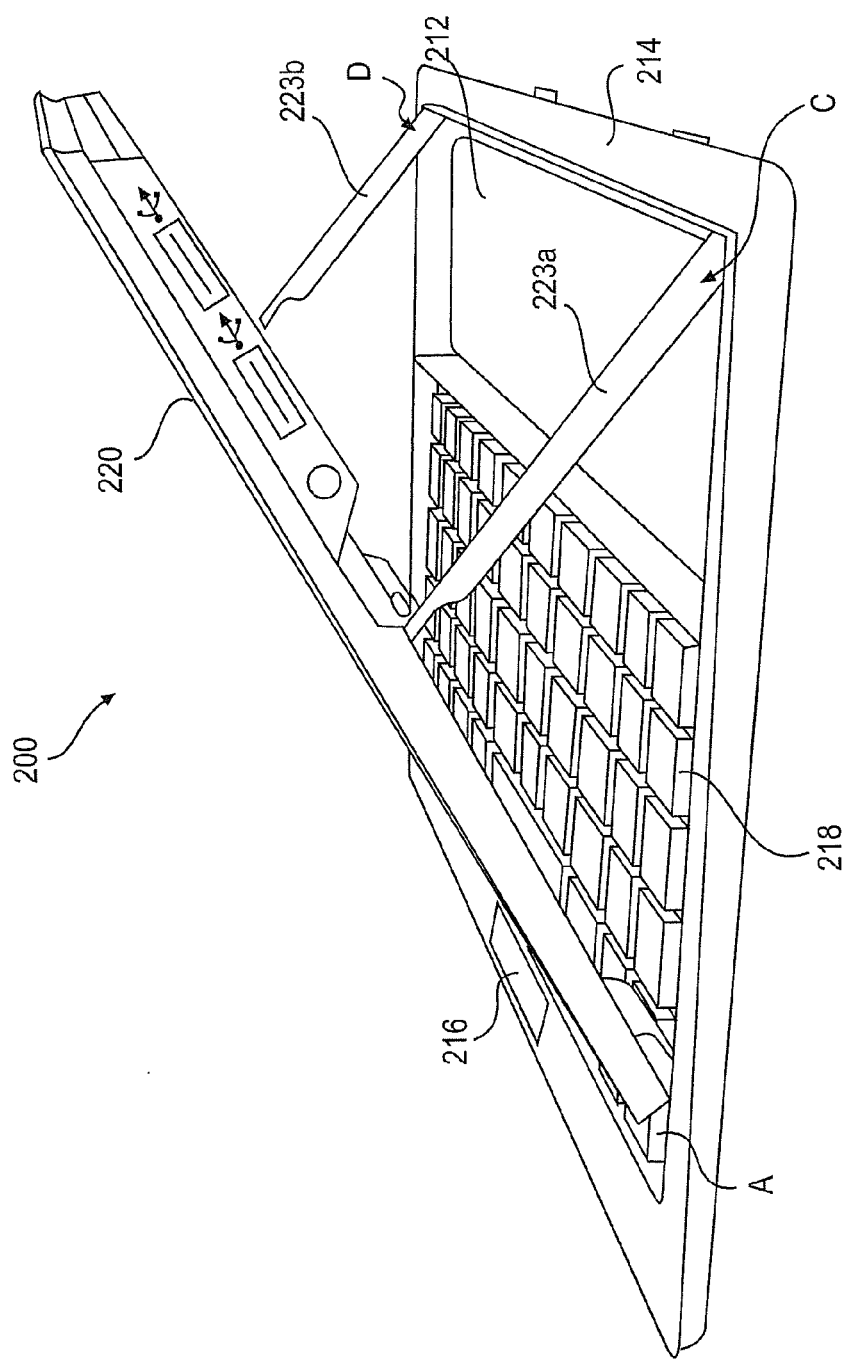
FIG. 6C is another side perspective view of the electronic device of FIG. 6A, shown with the display in an intermediate position.

FIG. 6A is a perspective view of an electronic device having a base in the form of an outer support frame according to another embodiment, shown with a display in a first position. FIG. 6B is a side perspective view of the electronic device of FIG. 6A, shown with the display in a second position. FIG. 6C is another side perspective view of the electronic device of FIG. 6A shown with the display in an intermediate position.

The embodiment of FIGS. 6A-6C is similar to the previously discussed embodiment, except in that the display 220 includes two support arms 223a and 223b. Thus, in the second position, the display 220 is supported by the outer support frame 214 at four points A, B, C, and D. Further, in the first position, the display 220 at least partially protrudes above an upper surface of the outer support ring 214, as shown in FIG. 6A. Otherwise, this embodiment is similar to the previously discussed embodiment, and repetitive disclosure has been omitted.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
   a base in the form of an outer support frame, the base having an opening extending therethrough formed by the outer support frame;
   a keyboard disposed within at least a portion of the opening and supported by the outer support frame; and
   a display to attach to the base, the display having a first thickness at a first portion and a second thickness at a second portion, the first thickness being greater than the second thickness, the display to be slidably attached to the base, the display to slide between a first position and a second position, the first position being when the second portion of the display is to cover the keyboard and the first portion of the display is to be provided in the opening, and the second position being when the display is positioned at an angle with respect to the outer support frame, wherein the display includes:
   a body having a rear surface at the first portion of the display,
   a single support arm to support the body when the display is in the second position, and
   a groove in the rear surface of the body, and the single support arm to be provided in the groove when the display is in the first position.

2. The electronic device of claim 1, wherein the display includes a plurality of protrusions or hooks to slidably engage with a plurality of grooves or rails in or on the base.

3. The electronic device of claim 1, further comprising a user input device, wherein the display does not cover the user input device, when the display is in the first position.

4. The electronic device of claim 3, wherein the user input device comprises a track pad input device.

5. The electronic device of claim 1, wherein a gap is provided between outer edges of the display and inner edges of the outer support frame, when the display is in the first position and the outer edges of the display are aligned with the inner edges of the outer support frame.

6. The electronic device of claim 1, wherein a first end of the single support arm is rotatably attached to the outer support frame and a second end is rotatably attached to a rear surface of the body.

7. The electronic device of claim 6, wherein the display includes a plurality of protrusions or hooks to slidably engage with a plurality of grooves or rails in or on the base.

8. The electronic device of claim 1, wherein the single support arm is configured to receive cabling for the keyboard, a battery, or other accessories.

9. The electronic device of claim 1, wherein the display further comprises a touchscreen.

10. The electronic device of claim 1, wherein the display comprises a touchscreen.

11. An electronic device, comprising:
   a base in the form of an outer structural frame; and
   a display to slidably attach to the base, the display having a first thickness at a first portion and a second thickness at a second portion, the first thickness being greater than the second thickness, wherein the display is configured to slide between a first position and a second position, the first position being when the second portion of the display is to cover a keyboard, and the second position being when the display is positioned at an angle with respect to the outer structural frame, wherein the display includes:
      a body having a rear surface at the first portion of the display,
      a single support arm to support the body when the display is in the second position, and
      a groove in the rear surface of the body, and the single support arm to be provided in the groove when the display is in the first position.

12. The electronic device of claim 11, wherein the display comprises a touchscreen.

13. The electronic device of claim 11, further comprising the keyboard disposed within at least a portion of the outer structural frame and supported by the outer structural frame.

14. The electronic device of claim 13, further comprising a user input device, wherein the display does not cover the user input device, when the display is in the first position.

15. The electronic device of claim 14, wherein the user input device comprises a track pad input device.

16. The electronic device of claim 11, wherein a gap is provided between outer edges of the display and inner edges of the outer structural frame, when the display is in the first position and the outer edges of the display are aligned with the inner edges of the outer structural frame.

17. The electronic device of claim 11, wherein a first end of the single support arm is rotatably attached to the outer structural frame and a second end is rotatably attached to a rear surface of the body.

18. The electronic device of claim 17, wherein the display includes a plurality of protrusions or hooks to slidably engage with a plurality of grooves or rails in or on the base.

19. The electronic device of claim 17, wherein the single support arm is configured to receive cabling for the keyboard, a battery, or other accessories.

20. The electronic device of claim 11, wherein the outer structural frame includes an opening extending therethrough based on the outer support frame, and the first portion of the display is provided in opening when the display is in the second position.

* * * * *